US007599404B2

(12) United States Patent
Salin et al.

(10) Patent No.: US 7,599,404 B2
(45) Date of Patent: Oct. 6, 2009

(54) COMPOSITE OPTIC FIBRE FOR LASER WITH PUMP AND LASER WAVE CONFINEMENT, APPLICATIONS TO LASERS

(75) Inventors: François Salin, Gradignan (FR); Jens Limpert, Talence (FR)

(73) Assignees: Centre National de la Recherche Scientifique, Paris (FR); Universite de Bordeaux 1, Talence (FR)

( * ) Notice: Subject to any disclaimer, the term of this patent is extended or adjusted under 35 U.S.C. 154(b) by 0 days.

(21) Appl. No.: 11/188,726

(22) Filed: Jul. 26, 2005

(65) Prior Publication Data

US 2006/0176911 A1     Aug. 10, 2006

(30) Foreign Application Priority Data

Feb. 4, 2005    (FR)  .................................. 05 50344

(51) Int. Cl.
*H01S 3/30*         (2006.01)
(52) U.S. Cl. ............................... 372/6; 372/39; 372/70; 372/109; 359/341.1; 359/341.3; 359/341.5; 359/345
(58) Field of Classification Search ..................... 372/6, 372/39, 70, 109; 359/341.1, 341.3, 341.5, 359/345
See application file for complete search history.

(56) References Cited

U.S. PATENT DOCUMENTS

2002/0172486 A1*   11/2002   Fermann ...................... 385/128
2005/0082470 A1*   4/2005   Dziekan et al. ............. 250/281
2005/0259942 A1*   11/2005   Temelkuran et al. ........ 385/147

OTHER PUBLICATIONS

Definition of rigid, as provided on www.dictionary.com noting that "rigid" is an adjective having a meaning including "hard."*
J. Limpert et al., "Low-nonlinearity single-transverse-mode ytterbium-doped photonic crystal fiber amplifier", Optics Express Opt. Soc. America USA, vol. 12, No. 7, Apr. 5, 2004, XP-002346902.

(Continued)

*Primary Examiner*—Wael Fahmy
*Assistant Examiner*—Hrayr A Sayadian
(74) *Attorney, Agent, or Firm*—Young & Thompson (57) ABSTRACT

A composite optic fibre for laser includes a core surrounded with a pump guiding sheath in contact with the core, sheath being a photonic structure formed by a substantially regular matrix assembly of coaxial capillaries, spaced apart and arranged parallel to the core, the core being a material with doping elements which may be brought into at least one excited electronic state by absorbing the energy from a pump optical signal of a first determined wavelength running through the core and capable of giving-back the former by de-energization in the form of an optical signal of a second determined wavelength, the core having a determined diameter and the sheath having a determined diameter. The diameter of the guiding sheath is greater than the core diameter and smaller than or equal to four times the core diameter, the core diameter being greater than or equal to 35 micrometers.

18 Claims, 4 Drawing Sheets

OTHER PUBLICATIONS

A. Liem et al., "Air-clad large-mode-area photonic crystal fibers: power scaling concepts up to the multi kW-range", Proceedings of the SPIE—The International Society for Optical Engineering SPIE, vol. 5335, No. 1, 2004, pp. 158-169, XP-002346903.

T. Schreiber et al., "High-power air-clad large-mode-area photonic crystal fiber laser", Lasers and Electro-Optics, 2003, IEEE, p. 656, XP-010711877.

J. Limpert et al., "High performance ultrafast fiber laser systems", Proceedings of the SPIE—The International Society for Optical Engineering SPIE, vol. 5335, No. 1, 2004, pp. 245-252, XP-002346904.

T. Schreiber et al., "High Power Photonic Crystal Fiber Laser Systems", Transparent Optical Networks, 2004, Proceedings of 2004 $6^{th}$ International Conference on Warsaw, Poland, vol. 1, pp. 131-135, XP-010743461.

* cited by examiner

COMPOSITE OPTIC FIBRE FOR LASER WITH PUMP AND LASER WAVE CONFINEMENT, APPLICATIONS TO LASERS

BACKGROUND OF THE INVENTION

1. Field of the Invention

The present invention relates to a composite optic fibre for laser with pump and laser wave confinement, it enables the realisation of high power lasers and may be applied to the realisation of laser systems of diverse types. The term laser covers any application wherein the light-emitting capacity of the fibre by electronic de-energisation of elements having been placed beforehand in electronic energised state, is implemented, this concerning the lasers as well as, more generally, the optical amplifiers. The fibre of the invention although it may be used in continuous emission lasers, enables to obtain more particularly interesting results in pulse-operated lasers.

2. Description of the Related Art

The operating principle of the laser is known, it consists, generally speaking, in transferring a so-called pump energy to a material medium for placing into energised electronic state elements of this medium, thereby creating an inversion of population, elements which will retrieve a basic electronic state while emitting an electromagnetic radiation coherently and at a predetermined wavelength thanks to an amplifying structure promoting these emission characteristics.

However, the conversion of energy is not perfect in a laser. On the one hand, all the pump energy is not used by the medium for the inversion of population and the amplifier gain G is expressed as being proportional to the ratio between the pump fluence Jp (energy density or, in the case of continuous emission, intensity) and a parameter of the medium called saturation fluence Jsat: $G=\exp(Jp/Jsat)$ and when the material exhibits high saturation fluence, high pump fluence should be used. On the other hand, during the emission, the emission wavelength is different, smaller, from that having been used for pumping and a portion of the excitation energy of the medium is not converted in the emission radiation and generates heat in the medium. Thus, if the material has high Jsat, the gain then being low, the pump power density should be high and the heat generated may become such that it reaches the fracture threshold of the material. Finally, the material media are not perfect optically and may exhibit absorption effects, diffraction or others which are sometimes non linear in relation to the energies involve which compromise the quality of the radiation transmitted.

Thus, in power lasers, it is particularly difficult to combine the average power, the energy and the spatial quality. Current high power lasers enable either to generate high powers and high pulse-operated energies, with detriment to the spatial quality of the beam, case of slab lasers or, still, thin disk lasers, or high powers, but without any possibility of pulse-operated radiation with small pulse width, case of fibre lasers.

SUMMARY OF THE INVENTION

High power slab lasers have a diameter of the order of a few millimeters and length of some ten cm. The diameter of this slab being very large before the wavelength it is particularly difficult to keep a beam quality close to the diffraction limit. Lasers generating high powers, typically greater than 100 W, are therefore multimode and, although of high power, they do not enable to obtain very high intensities (power surface density). Moreover, the small size if the thin disk lasers raises heat dissipation problems which are difficult to solve simply.

In the case of fibre power lasers, because of the very great length of such fibres, these are non-linear effects which are predominant. Among these effects, one may quote the Raman effects, phase self-modulation, self-focus . . . the non-linear effects are proportional to the product of the peak power of the signal and of the propagation length, i.e. the length of the fibre, and are thus mainly marked in the case of short-pulse lasers. Consequently, picosecond or femtosecond pulse lasers are currently limited to energies smaller than typically some hundred microjoules.

It has been suggested to increase the efficiency of fibre lasers implementing photonic optical means as in the article <<High-power air-clad large mode area photonic crystal fibre laser>> of J. Limpert and al. 7 AVR 2003, Vol. 11, No 7, OPTICS EXPRESS 818 with a 2.3-m long composite fibre whereof the triangular active core with an approximate diameter of 28 μm and is surrounded with an air hole matrix distribution area.

The present invention provides a composite optic fibre which combines certain of the characteristics of the slab lasers and of the fibre lasers. In particular, it is an optic fibre but which is of reduced length with respect to the laser fibres known while having an active medium (zone where the laser effect may be produced) of great section contrary to known laser fibres, which makes it closer to the slabs. Moreover, particular means are implemented in the optic fibre as a photonic structure for guiding the pump and laser waves. The very great section of the active core associated with a very short length enables the fibre of the invention to be used as a power optical amplifier and, in the case of laser pulses, to obtain great powers without reaching the apparition threshold of undesirable non-linear effects.

The invention relates therefore to a composite optic fibre for laser comprising a core surrounded with a pump guiding sheath in contact with and surrounding the core, the pump guiding sheath being a photonic structure formed by a substantially regular matrix assembly of spaced capillaries arranged parallel to the core in a pump guiding sheath material, the core being in a core material with moreover doping elements which may be brought into at least one excited electronic state by absorbing the energy from a pump optical signal of a first determined wavelength running through said core and capable of giving-back the former by de-energization in the form of an optical signal of a second determined wavelength, the core having a determined diameter and the pump guiding sheath having a determined diameter.

According to the invention, the diameter of pump guiding sheath is greater than the core diameter and smaller than or equal to four times the core diameter, the core diameter being greater than or equal to 35 micrometers.

In various embodiments of the invention, the following means may be used individually or in all their technically possible combinations:

- the core diameter is approximately 35 micrometers,
- the diameter of the pump guiding sheath is smaller than 140 micrometers and, preferably, is approximately 130 micrometers,
- the pump guiding sheath has hexagonal section,
- the pump guiding sheath has hexagonal section, the corner to corner diameter being approximately 141 μm and the plane to plane diameter is 117 μm,
- the length of the fibre is smaller than one meter,
- the length of the fibre is smaller than 50 cm,
- at least one portion of the pump guiding sheath which is globally substantially transparent for the pump signal at the first wavelength includes within the material forming the pump guiding sheath elements reducing the transmission of the optical signal of second wavelength, (the elements in question are elements which induce by any optical effect a decrease in the transmission of the optical signal of second wavelength in the pump sheath and it is therefore considered that, for instance, in addition to absorbing and/or reflecting and/or diffusing and/or diffracting elements, a photonic structure or a grid generating such a result are part of such elements)

at least one portion of the pump guiding sheath which is substantially transparent for the pump signal at the first wavelength includes within the material forming the pump guiding sheath of the absorbing and/or reflecting and/or diffusing and/or diffracting elements the optical signal of second wavelength, the portion of the pump guiding sheath which includes absorbing and/or reflecting and/or diffusing and/or diffracting elements the optical signal of second wavelength is the portion in contact with the core of the fibre, the absorbing and/or reflecting and/or diffusing and/or diffracting elements are selected among the metal microparticles or nanoparticles, the rare earths or the semi-conductors, the optical sheath includes moreover a confinement sheath around the pump guiding sheath, said confinement sheath having an optical index smaller than the optical index of the material forming the pump guiding sheath, the confinement sheath includes mainly air and is formed by an adjoining assembly of attached capillaries (air-filled thin-walled tubes), in the confinement sheath, the walls of the attached capillaries represent a volume of material at least 10 times smaller than the volume of air, the fibre includes moreover a mechanical rigidification sheath arranged around the confinement sheath, the mechanical sheath is of a material selected among the organic polymers or the mineral matters and, in the latter case, is preferably of glass or pure silica, the mechanical sheath has a diameter of at least one millimeter, the mechanical sheath has a diameter ranging between one millimeter and 10 millimeters, the core material is identical to the material forming the pump guiding sheath (the core includes moreover dopants and the pump guiding sheath possibly and additionally absorbents . . . ), the core material is identical to the material forming the pump guiding sheath and is pure silica (the core includes moreover dopants and the pump guiding sheath possibly and additionally absorbents . . . ), the core material is identical to the material forming the pump guiding sheath and is glass (the core includes moreover dopants and the pump guiding sheath possibly and additionally absorbents . . . ).

The invention also relates to a fibre laser which includes the fibre according to one or several previous characteristics and which includes moreover means individual to the fibre and/or external to the fibre enabling to form an optically tuned cavity containing the fibre in order to produce a laser optical signal of second wavelength.

The laser may also comprise the following means which may be used individually or in all their technically possible combinations:

the individual means enabling to form an optically tuned cavity containing the fibre are at least a planar mirror at the end of the fibre and perpendicular to the greater axis of said fibre, the planar mirror at the end of the fibre is reflecting over at least a portion of the optical signal of second determined wavelength, the planar mirror at the end of the fibre is reflecting over at least a portion of the pump optical signal, the planar mirror at the end of the fibre is reflecting over at least a portion of the optical signal of second determined wavelength and over at least a portion of the pump optical signal, the planar mirror is polished planar end face of the fibre and covered with a reflecting compound, the planar mirror is a pile of optically active layers, the individual means enabling to form an optically tuned cavity containing the fibre are at least a polished planar face at the end of the fibre and perpendicular to the greater axis of said fibre, the external means enabling to form an optically tuned cavity containing the fibre are at least one external planar mirror, the external planar mirror is reflecting over at least a portion of the optical signal of second determined wavelength, the external planar mirror is reflecting over at least a portion of the pump optical signal, the external planar mirror is reflecting over at least a portion of the optical signal of second determined wavelength and over at least a portion of the pump optical signal, the external means enabling to form an optically tuned cavity containing the fibre are at least a perpendicular external optical grid and along the greater axis of said fibre, the external optical grid is adjustable in order to tune the laser, the pump optical signal is injected into the fibre axially in the core and the pump guiding sheath, the pump optical signal is injected into the fibre radially along said fibre, the pump optical signal is generated by at least a light-emitting diode, the light-emitting diode of pump is at least a laser diode, the laser is composed of an assembly of at least two composite fibres of the invention, said fibres being used in a series and/or parallel assembly, the laser is pulsed and includes a trigger cell, the laser is used as an amplifier for an optical signal containing optic pulses, the fibre being run through by the optical signal to be amplified and the pulses triggering the laser emission.

As regards the modalities of realisation of the fibre of the invention one or several of the following modalities are considered:

the fibre is assembled by placing parallel a wire (the core is formed of a single wire) or a set of wires (the core is formed of a set of wires) of core material surrounded with wires and material capillaries forming the pump guiding sheath according to the matrix distribution, said assembly being heated in order to weld said wires and capillaries together and form substantially homogeneous structure, the fibre is assembled by placing parallel a wire or a set of wires of core material surrounded with wires and material capillaries forming the pump guiding sheath according to the matrix distribution, a set of attached capillaries being arranged around to form the confinement sheath, said assembly being heated to weld said wires and capillaries together and form substantially homogeneous structure, the fibre is assembled by placing parallel a wire or a set of wires of core material surrounded with wires and material capillaries forming the pump guiding sheath according to the matrix distribution, a set of attached capillaries being arranged around to form the confinement sheath, a mechanical sheath material being arranged externally to form the mechanical sheath, said assembly being heated to weld said wires and capillaries together and form substantially homogeneous structure, the realisation of the fibre is conducted by heating steps, in the case of a set of wires of core material, a first step consisting in forming the assembly of the core then in heating it to weld said wires to form substantially homogeneous core structure, the core material wire(s) have initially doping elements, the doping elements are incorporated in the core after the realisation step of the core by heating, the realisation of the fibre is conducted by heating steps, once the core has been made (case of a set of wires) or the core wire available (the core is formed of a single wire), the following step consists in realising the pump guiding sheath which is heated to weld said wires and capillaries together and form substantially homogeneous pump guiding structure around the core, the realisation of the fibre is conducted by heating steps, once the pump guiding sheath has been made, the following step consists in providing the confinement sheath which is heated to weld said capillaries together and form substantially homogenous confinement sheath structure around the pump guiding sheath, the realisation of the fibre is conducted by heating steps, once the pump guiding sheath has been made, the following step consists in providing the mechanical sheath by heat-depositing a mechanical sheath material around the confinement sheath, the wires are heated to a temperature making it pasty during assembly.

The invention enables to generate coherent light radiations of very high average power while preserving excellent spatial quality and the capacity of generating high-energy pulses. Besides, it enables to increase very largely the field of use of the optical amplifiers and lasers. It is therefore possible to obtain, simultaneously, very high average energies and powers and excellent beam quality with relatively simple system which do not always require active cooling. Applications in all-fibre system are possible, which enables to provide particularly robust appliances for field use or others.

The application of the fibre to high-power short-pulse lasers provides access to the industrial field (machining, etching, marking . . . ), to the medical field (eye surgery, medical imaging device . . . ), to the field of material or environmental analyses (LIDAR . . . ), fundamental research . . .

BRIEF DESCRIPTION OF THE DRAWINGS

The present invention will now be exemplified without being limited thereto with the following description in conjunction with the figures below:

FIG. 1 which represents schematically a simplified composite fibre, seen radially and in transparency, FIG. 2 which represents schematically a simplified composite fibre, seen axially/transversally and in transparency, FIG. 3 which represents an enlargement of the composite fibre of the invention along a cross-sectional view of its central portion, FIG. 4 which represents an application of the composite fibre of the invention to a pulse-operated amplifier, FIG. 5 which represents a continuous laser with the composite fibre of the invention, FIG. 6 which represents the curve of output power in W relative to the pump power in W sent in the fibre of a laser using the composite fibre of the invention as well as the corresponding efficiency slop, FIG. 7 which represents the wave spectrum of a laser using the composite fibre of the invention with the logarithmic scale intensity in arbitrary units versus the wavelength in nm, FIG. 8 which represents a pulse-operated laser with the composite fibre of the invention, FIG. 9 which represents a curve of the pulse duration in logarithmic scale of ns versus the energy extracted by the pulse in µJ for diverse repetition frequencies of the pulse-operated laser of the FIG. 8, FIG. 10 which represents the curve of pulse intensity in arbitrary units versus time for the pulse-operated laser of FIG. 8, FIG. 11 which represents the spectrum of the wave of the pulse-operated laser of FIG. 8 with the intensity in arbitrary units versus the wavelength in nm.

DETAILED DESCRIPTION

Figure 1:
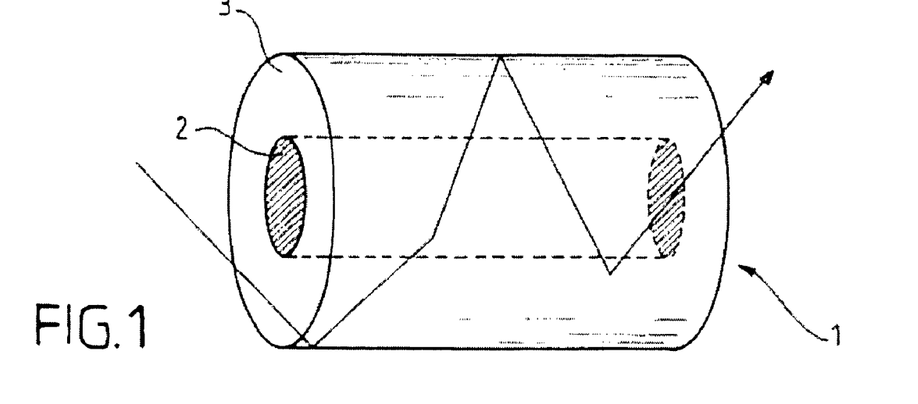
Figure 2:
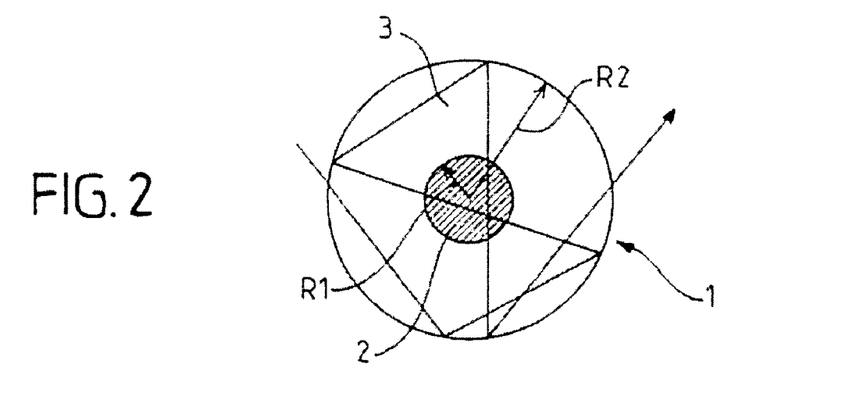

As represented schematically on FIGS. 1 and 2, the invention as a whole consists of a composite fibre 1 for laser (or optical amplifier) which includes in its active portion a core 2 substantially cylindrical of radius r1 composed of a material exhibiting an optical gain at the wavelength of the laser signal and absorbing at the pump wavelength. This core is surrounded with an optical sheath 3 of radius r2 composed of a transparent material at the pump wavelength. Both these figures represent an example of a path of a pump wave photon running through the core and reflected at the periphery of the optical sheath to be confined inside the composite fibre 1. The optical indices between the optical sheath 3 and the outside of the optical sheath are such that said confinement is provided (external index smaller than the index of the optical sheath). Similarly, the optical indices of the core 2 and of the optical sheath 3 are such that the pump wave may effectively run through the core 2 and, preferably, the laser wave is confined in the core. The ratio of the diameters r2/r1 is selected so as to be small, typically smaller than 10 and preferably smaller than 4. The total length of the composite fibre in its main applications is typically smaller than 50 cm.

The core 2 and the optical sheath 3 are designed so as to enable only propagation of the fundamental mode of the laser wave in the core of the composite fibre. This may be obtained either by judicious choice of the refraction indices of the core and of the optical sheath or by a photonic crystal-type structure as preferred. This condition should be satisfied for core diameters vastly greater than the wavelength, typically greater than 30 times the wavelength. The optical sheath, for its own part, should preferably exhibit very wide numerical aperture, thanks for instance to air exposure or thanks to a coating with very small index material as will be seen later with the confinement sheath. Preferably, this very small index material is air or a structure with very high air content. The whole is pumped longitudinally (along the main axis of the fibre) by one or several light-emitting diodes, in particular laser diodes, to obtain an inversion of population corresponding to excited state of the elements of the active core of the composite fibre.

It will be seen later on, while detailing a preferred structure of composite fibre that the optical sheath corresponds in practise to a pump guiding sheath and that the latter is surrounded with a confinement sheath and that the pump wave is reflected inside the fibre at the interface between the pump guiding sheath and the confinement sheath.

One may calculate the necessary length $L_{\text{eff}}$ to absorb practically the whole energy of the pump by the following formula: $L_{eff}=1/\alpha(d_g/d_c)^2$ where $\alpha$ is the linear absorption coefficient of the material constituting the core of the fibre, $d_g$ is the diameter of the sheath wherein the pump wave propagates and $d_c$ the core diameter of the fibre wherein the signal to be amplified/laser propagates.

The small ratio r2/r1 used in the composite fibre of the invention enables to absorb practically the whole energy of the pump over very small distance (×0,1) compared to a conventional optic fibre, but nevertheless much longer (×1000) than the conventional thickness of the slab laser crystals. The greater length of the composite fibre of the invention compared with that of the massive materials enables to reduce significantly the thermal effects whereas the short length of the composite fibre of the invention with respect to the conventional fibres (ration $d_g/d_c$ of the order of 30 to 100 which implies fibres above 10 m) enables to reduce non-linear effects.

Figure 3:
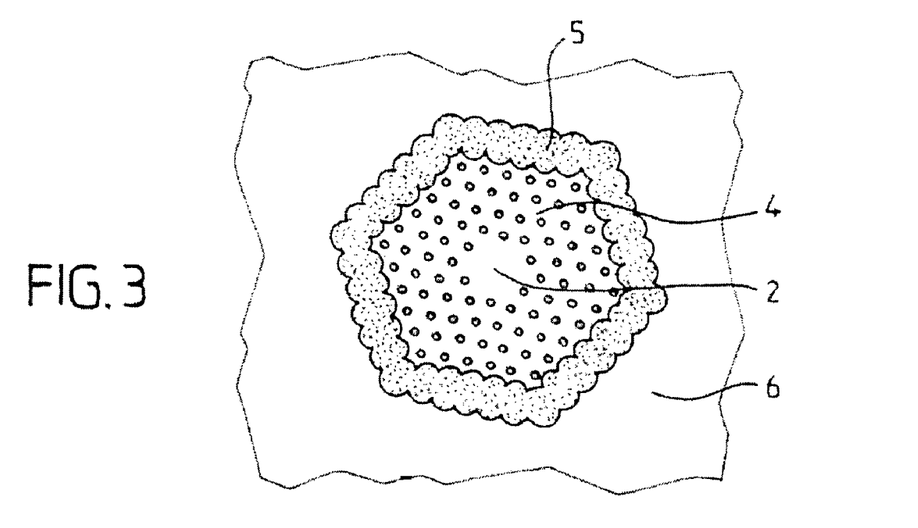

By way of example of a preferred embodiment of the invention and as represented on FIG. 3, the core 2 of the composite fibre is a silica slab of approximately 40 microns in diameter doped by ytterbium ions. Such core 2 is included in a pump guiding sheath 4 of approximately 120 microns of diameter of pure silica and which includes a certain number of small diameter hollow tubes (black spots arranged regularly on FIG. 3) forming a photonic crystal and which guarantees that only the fundamental laser mode may propagate in the core. The pump guiding sheath 4 is surrounded with a confinement sheath 5 of capillary crown type (air-filled thin-walled tube) with small wall thickness relative to the diameter thereof, which guarantees very high confinement of the pump wave since the optical index of this crown is very small relative to that of the pump guiding sheath and is close to 1. The numerical aperture of such a structure is greater than 0.6. The whole structure may be coated with a mechanical sheath 6 of great diameter glass (1 to 10 mm) in order to confer thereto better mechanical and thermal stability as represented in the example of FIG. 3.

The optical index of the core is greater than the average index of the pump guiding sheath and the average optical index of the confinement sheath is smaller than the average index of the pump guiding sheath. In the embodiment example, the average index of the pump guiding sheath is approximately 1.5 and of the confinement sheath close to 1.

In a particular embodiment, the pump guiding sheath 4 comprises elements which are transparent at the pump wavelength but absorbing at that of the laser radiation and which corresponds therefore substantially to gain band of the core 2. The term absorbing covers the absorption properly speaking as well as notably the diffusion or the diffraction. This arrangement enables to avoid the amplification of the portion of the laser wave which would not have been injected correctly in the core and which could nevertheless reduce the population excited in the core. The absorption may be due to the use of absorbing elements (ions for instance) included in the pump guide during the manufacture of the structure or by geometrical processes by writing long period grids in the pump guide to couple outwardly the laser wavelength which are therefore not oriented correctly along the main axis of the fibre.

Such a composite fibre structure may be used to produce continuous or pulsed radiations. It may be used in a laser resonator or as an optical amplifier.

Figure 4:
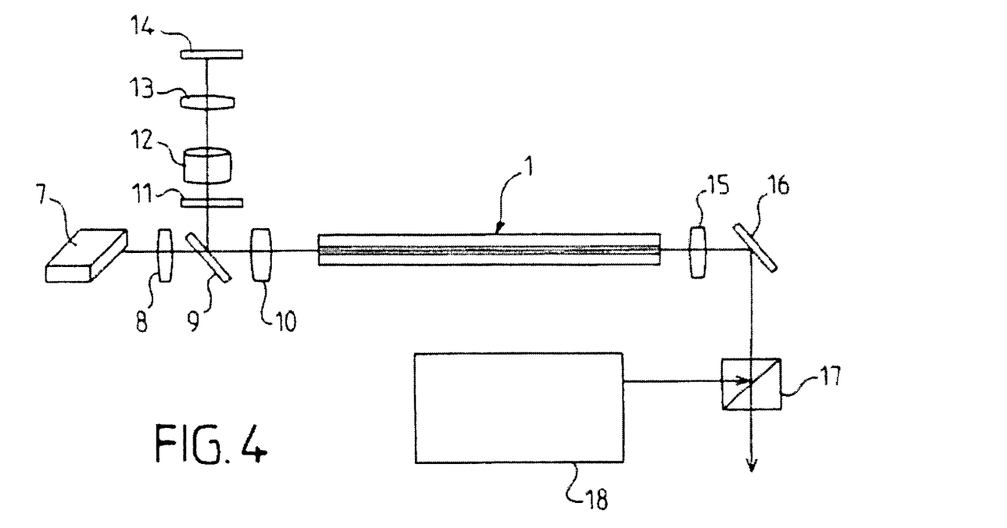

An example of use of a composite fibre according to the invention as a pulse amplifier is given in relation with FIG. 4. From left to right, one can see a diode laser-type optical pumping device 7 whereof the beam is sent to a first lens 8 and runs through a dichroic plate 9 then a second lens 10 before entering the composite fibre 1 axially. The laser beam generated may come out of the fibre by both its ends. Through the pumping end, the laser beam is sent back by the dichroic plate 9 towards an optical path containing a half-wave plate 11 for filtering purposes, a Faraday rotator 12 for polarisation adjustment, a third lens 13 and a mirror 14 for sending the laser beam back towards the composite fibre 1 through the previous optical elements. At the other end of the composite fibre the laser beam is sent to a fourth lens 15 then a possible intermediate mirror 16 towards a polariser 17 which may also receive optical pulses from a source which is here a source of laser pulses 18. The laser pulses of the source 18 are sent by the polariser 17 towards the composite fibre 1 and enable to trigger laser effect over an inversed/excited population by the pump 7 of the core of the fibre 1. Laser pulses are thus created in the fibre 1 synchronously with those of the source 18. Such an implantation uses the fibre in double-pass and includes a polarisation rotation system. This implantation enables to generate a rectilinear polarisation.

Preferably, all the materials implemented in the fibre are identical in order to avoid differential expansion problems and this will be glass or preferably pure silica and containing moreover dopants and/or possible absorbents according to the position in the fibre. The dopants for the active core of the fibre are mainly rare earths as ytterbium or the ytterbium and erbium association. Other dopants are usable notably aluminium and fluorine and they will be selected relative to the conditions of use and notably the wavelength of the pumping optical wave. For a LED-type pumping around 976 μm, ytterbium may be used on its own.

A composite fibre has been implemented in a laser application and its active ytterbium-doped core has a diameter of approximately 35 μm. The pump guiding sheath at a grid/matrix structure of capillaries (appearing as air holes in cross-section of the fibre) of photonic crystal type and exhibits substantially hexagonal external shape whereof the corner-to-corner diameter is approximately 141 μm and plane-to-plane diameter of 117 μm. The hole diameter/grid pitch ratio is approximately 0.33. Around the pump guiding sheath, a confinement sheath is arranged which includes mainly air and resulting from the attachment of capillaries. The pump sheath enables the confinement of the laser wave in the core of the fibre and lets the pump wave through which will be reflected onto the confinement sheath to be sent back to the core which it will be able to excite. Finally, a mechanical sheath approximately 1.70 mm in diameter surrounds the confinement sheath. The length of the fibre is approximately 48 cm. The numerical aperture of this structure is approximately 0.6 and enables the implementation of an axial pumping by conventional light-emitting diodes of numerical aperture 0.22 to 400 μm, notably laser diodes.

Figure 5:
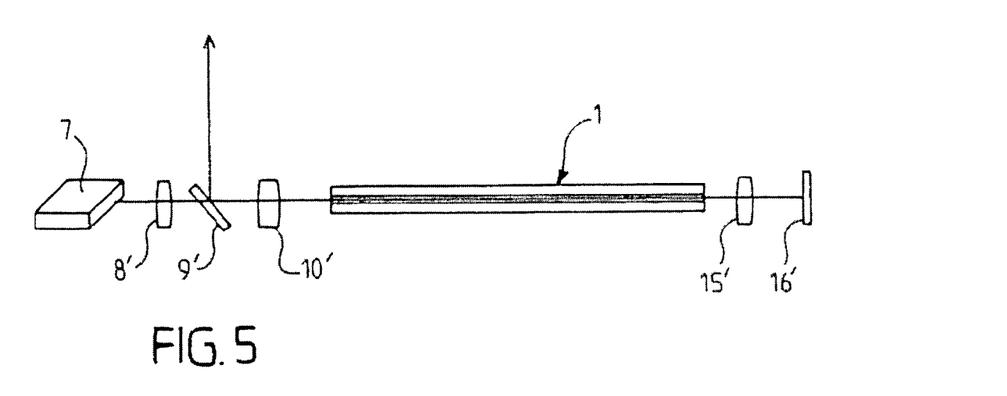

A continuous laser assembly has been provided wherein the composite fibre of the invention has been placed in a cavity delineated on a first side by a highly reflecting mirror and on the second side by Fresnel reflecting system at approximately 4%. This continuous laser assembly is represented on FIG. 5 with, from left to right, a diode laser-type optical pumping device 7 whereof the beam is sent to a first lens 8' and runs through a dichroic plate 9' (Fresnel reflector) then a second lens 10' before entering the composite fibre 1 axially. The laser beam generated may come out of the fibre through both its ends. Through the pumping end, the laser beam is sent back by the dichroic plate 9' for laser output. At the other end of the composite fibre, the laser beam is sent onto a lens 15', then a return mirror 16'.

Figure 6:
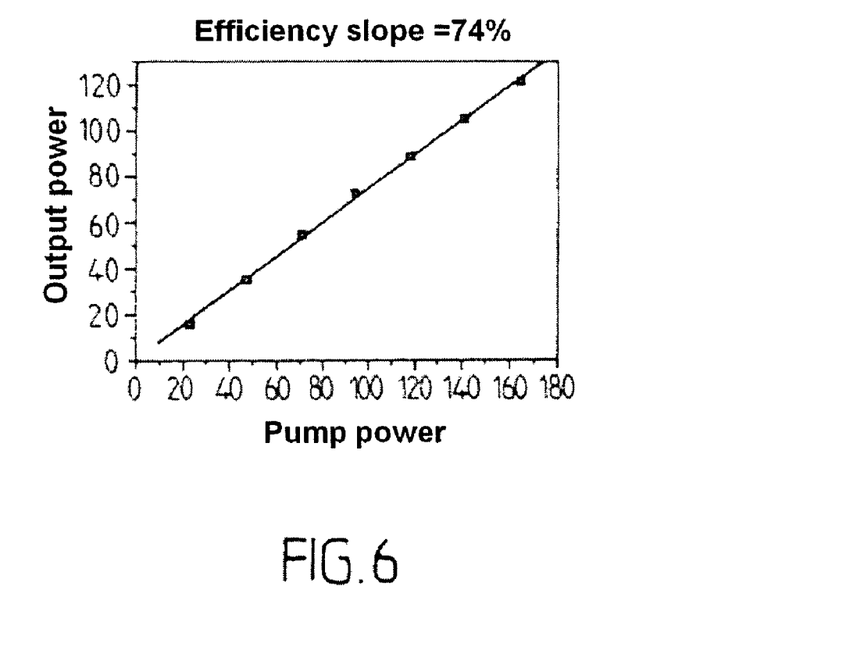
Figure 7:
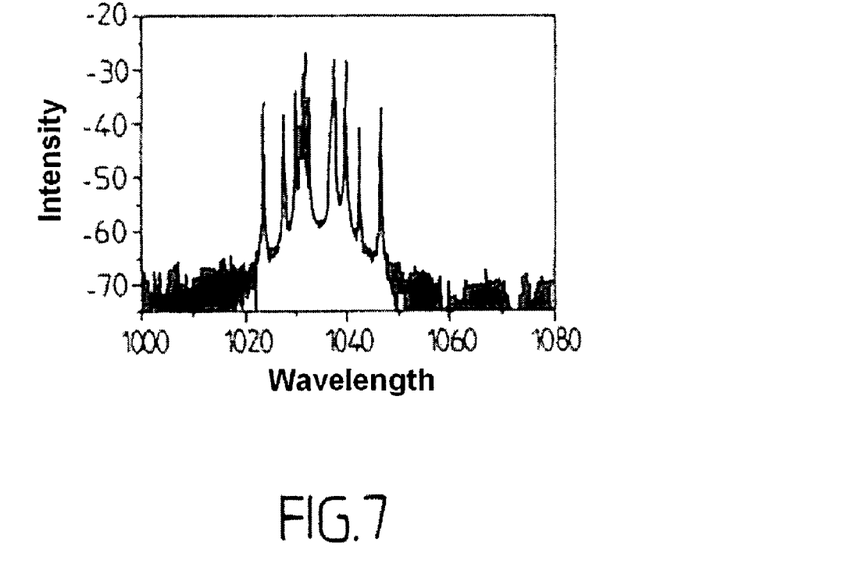

For this continuous laser assembly, the absorption coefficient of the pump wave has been determined at approximately 30 dB/m to 976 nm in wavelength. The efficiency slope represented on FIG. 6 has been determined at 74% and the laser emission threshold is relatively low at less than 10 W pumping. These results have been obtained with pumping by both ends of the fibre which are sliced perpendicular to the main axis of the fibre. With 165 W pumping wave at 976 nm, a 120 W laser at a wavelength of 1030 nm has been obtained and a linear power of 250 W/m has been determined. The spectrum of the laser wave obtained is represented on FIG. 7. It should be noted that for these trials providing a linear power of 250 W/m, the fibre was not forcibly cooled and was simply in air. These results are already greater than those of the conventional long laser fibres and without the limitations due to the non-linear effects because of the very short length of the fibre of the invention. Greater powers/energies seem to be reachable because of the absence of inflexion of the efficiency curve in the measuring range of the tests.

The mechanical sheath, preferably made of glass (pure silica), in addition to the mechanical rigidity and the mechanical protection of the confinement sheath which is relatively fragile since formed by an adjoining assembly of capillaries of relatively large diameter and small wall thickness, also enables the dissipation of the heat generated in the fibre. The mechanical sheath may be left in open air or other gas (possibly forced ventilation) or be arranged in a cooling liquid. In the case when the external surface of the mechanical sheath may be shaped other than circular, an external shape is contemplated whereof a portion of the surface is planar, for instance fibre with mechanical sheath of triangular or square section, since this planar portion may be arranged on a heat-sink type cooling metal surface with possible interposition of a heat-conductive paste (the expansion indices might be different between the mechanical sheath and the heat-sink, it is preferable to avoid direct bonding of the fibre on the heat-sink).

The material of the mechanical sheath may be different from glass (pure silica), but the expected heating-up effect should be taken into account the selection thereof, in addition to the limitation of the differential thermal expansion effects, a material remaining solid at the expected temperature will be selected which might limit the choice in the case of organic polymer-type thermoplastic materials. In a variation, an external protective layer of thermoretractable sleeve type, may be implemented around the mechanical sheath.

The composite optic fibre of the invention may be implemented in a triggered laser generating pulses shorter than 10 ns because of the short length of the fibre. Such an experimental laser assembly at approximately 1030 nm wavelength is provided on FIG. 8 where one can see, from top to bottom, a pumping system 7 with light-emitting diode(s) at 976 nm wavelength, a first lens 19, a dichroic mirror 20 having a response curve as it reflects the wavelengths greater than 1010 nm and transmits the wavelengths smaller than 990 nm, a second lens 21, the fibre 1 of the invention with end faces perpendicular to the main axis of the fibre, a third lens 22, a thin film polariser 23, a trigger cell 24 (Pockels cell) and a mirror 25 reflecting the wavelengths greater than 1010 nm. The trigger cell has a rising time of approximately 10 ns and the rest time/emission time ratio has been ranging between 1 and 50. The pulse-operated laser signal is extracted by the dichroic plate 20.

Figure 8:
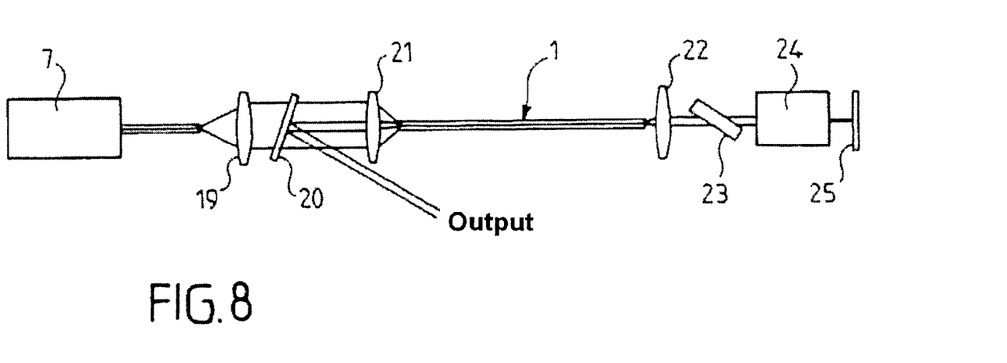

The fibre is approximately 43 cm long and the cavity is approximately 60 cm long. For this fibre, the hole diameter/grid pitch ratio of the pump guiding sheath is approximately 0.33. A 25 dB gain with simple pass saturation has been measured.

Figures 9, 10:
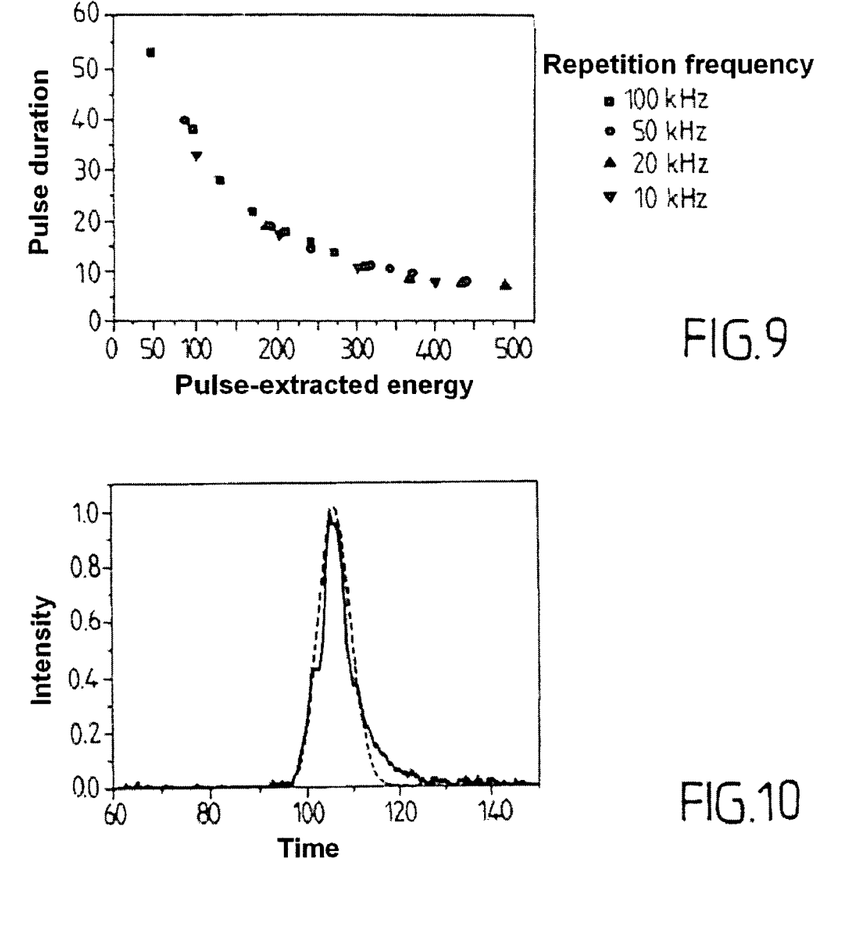
Figure 11:
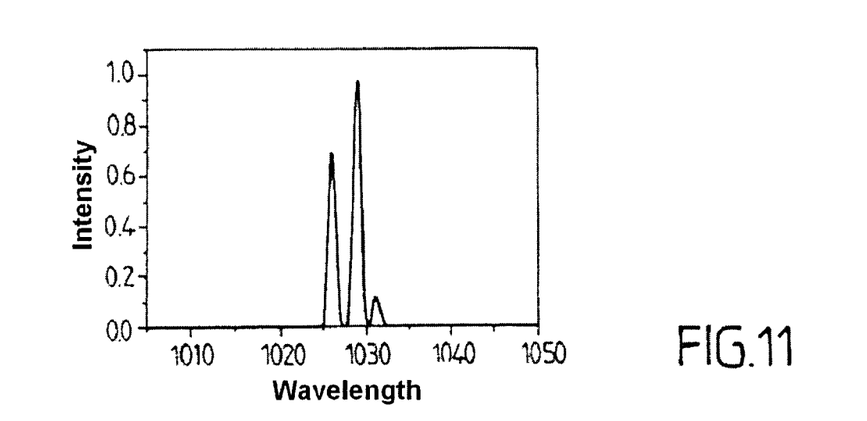

The energy of the pulses obtained is given on FIG. 9 for several repetition frequencies between 2.5 and 100 kHz. FIG. 10 illustrates the duration of the laser pulses in the case of pulses under 10 ns duration. The shortest duration laser pulse with this experimental assembly has been 7.5 ns. FIG. 11 finally give the spectral distribution of the laser wave which is around 1030 nm and approximately 4 nm in width. This small wavelength is due to the high excited population density, leading to a shift of the maximum gain towards the smallest wavelengths caused by the 3 levels of ytterbium. Finally, the polarisation degree has been measured as better than 1 to 20.

This assembly has thus enabled to generate pulses of approximately 10 ns at 500 µJ and an average 31 W power limited by the available pumping power. However, it has been preferable to limit the energy extracted at 500 µJ because of possible damages on the output faces of the fibre which are here perpendicular to the great axis of the fibre. The implementation of oblique planar output faces and/or the attachment or weld of end caps to the output faces would enable to limit these risks and thereby to extract a larger quantity of energy. The end caps are glass pellets (silica) substantially homogeneous or with index gradient, 5 to 6 mm in thickness, wherein the beam may spread, which enables to reduce the surface energy at the laser output and to remain below destructive levels. The experiments conducted have shown that it appeared possible to obtain better results because the theoretical limits of such a triggered laser had not been reached.

It may be noted that because the composite fibre does not cause any polarising phenomena, it is possible to pump the composite fibre by two polarised pump waves, oriented perpendicular to one another, through the same end face of the composite fibre. This may be realised at each of the ends of the composite fibre, one may quadruple the pump power relative to conventional pumping of a single end of a composite fibre.

The invention claimed is:

1. A composite optic fibre (1) for a laser, comprising:
    a core (2), the core (2) having a determined diameter and comprising a core material with additional doping elements which may be brought into at least one excited electronic state by absorbing energy from a pump optical signal of a first determined wavelength running through said core and capable of giving-back the former by de-energization in the form of an optical signal of a second determined wavelength;
    a pump guiding sheath (4) having a determined diameter surrounding and in contact with the core (2), the pump guiding sheath (4) being a photonic structure formed by a substantially regular matrix assembly of spaced capillaries arranged parallel to the core (2) in a pump guiding sheath material;
    a confinement sheath (5) around the pump guiding sheath (4), said confinement sheath (5) having an optical index smaller than an optical index of a material forming the pump guiding sheath (4); and
    a mechanical rigidification sheath (6) arranged around the confinement sheath (5), a material of the mechanical rigidification sheath (6) being glass or silica, the mechanical rigidification sheath (6) having a thickness of at least 2 mm,
    wherein the diameter of pump guiding sheath (4) is greater than the core diameter and smaller than or equal to four times the core diameter, the core diameter being greater than or equal to 35 micrometers, the fibre having a length less than 50 cm, and the fibre is straight and rigid.

2. The optic fibre according to claim 1, wherein at least a portion of the pump guiding sheath (4) which is globally substantially transparent for the pump signal at the first wavelength includes within the material forming the pump guiding sheath elements reducing the transmission of the optical signal of the second wavelength.

3. The optic fibre according to claim 1, wherein the confinement sheath (5) includes mainly air and is formed by an adjoining assembly of attached capillaries.

4. A fibre laser comprising:
the fibre of claim 1; and
means individual to the fibre and/or external to the fibre allowing formation of an optically tuned cavity containing the fibre in order to produce a laser optical signal of the second wavelength.

5. The laser according to claim 4, wherein the pump optical signal is injected into the fibre axially in the core (2) and the pump guiding sheath (4).

6. A laser comprising:
the fibre of claim 1; and
a trigger cell (24),
wherein the laser is pulsed.

7. A laser comprising:
the fibre of claim 1, wherein the laser is an amplifier for an optical signal containing optic pulses, the fibre being run through by the optical signal to be amplified and the pulses triggering the laser emission.

8. The optic fibre according to claim 1, wherein at least a portion of the pump guiding sheath (4) is transparent for the pump signal at the first wavelength and includes within the material forming the pump guiding sheath (4) elements reducing the transmission of the optical signal of the second wavelength.

9. The laser according to claim 5, wherein the laser is pulsed and includes a trigger cell (24).

10. The laser according to claim 5, wherein the laser is an amplifier for an optical signal containing optic pulses, the fibre being run through by the optical signal to be amplified and the pulses triggering the laser emission.

11. The laser according to claim 7, wherein the pump optical signal is injected into the fibre axially in the core (2) and the pump guiding sheath (4).

12. A continuous laser assembly, comprising:
the composite optical fibre according to claim 1;
a cavity containing the optical fibre;
a highly reflecting mirror at a first side of the cavity; and
a Fresnel reflecting system at a second side of the cavity.

13. The continuous laser assembly according to claim 12, further comprising:
a diode laser optical pumping device, wherein a beam is sent to a first lens and runs through a dichroic plate and a second lens, before the beam axially enters the composite optical fibre.

14. The continuous laser assembly according to claim 13, wherein a generated laser beam is sent back by the dichroic plate for laser output at a first end of the composite optical fibre, and the laser beam is sent onto a lens and a return mirror at a second end of the optic fibre.

15. The continuous laser assembly according to claim 12, wherein the continuous laser assembly is an amplifier.

16. The laser according to claim 4, wherein the laser is an amplifier for an optical signal containing optic pulses, the fibre being run through by the optical signal to be amplified and the pulses triggering the laser emission.

17. The laser according to claim 5, wherein the laser is an amplifier for an optical signal containing optic pulses, the fibre being run through by the optical signal to be amplified and the pulses triggering the laser emission.

18. The laser according to claim 6, wherein the laser is an amplifier for an optical signal containing optic pulses, the fibre being run through by the optical signal to be amplified and the pulses triggering the laser emission.

\* \* \* \* \*